United States Patent Office 3,357,801
Patented Dec. 12, 1967

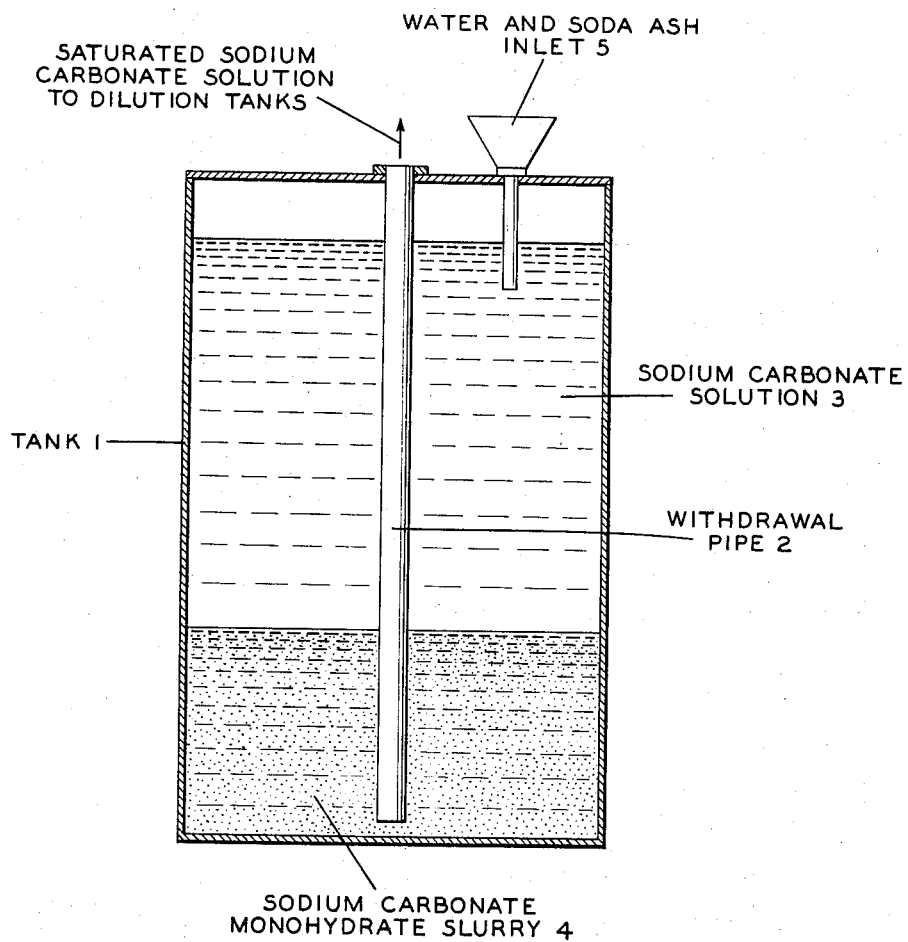

3,357,801
STORAGE OF SODA ASH SLURRIES
William H. Weed and John M. Price, Onondaga County, N.Y., assignors to Allied Chemical Corporation, New York, N.Y., a corporation of New York
Filed Nov. 12, 1963, Ser. No. 322,695
3 Claims. (Cl. 23—312)

ABSTRACT OF THE DISCLOSURE

A clear solution of sodium carbonate is withdrawn from slurry layer of the monohydrate below a supernatant layer at a velocity not exceeding 0.3 ft./min.

---

The present invention relates to the storage of soda ash and the recovery of sodium carbonate solution from storage. In particular, it concerns storage of a slurry of sodium carbonate monohydrate in sodium carbonate solution so as to provide a layer of sodium carbonate solution, and the recovery of the solution.

The storage of sodium carbonate monohydrate in slurry form as a layer of monohydrate crystal and a supernatant layer of sodium carbonate solution has been used in the past as a convenient and economical way of storing soda ash and to provide sodium carbonate in solution form, recovery of the desired solution being from the supernatant layer. Addition of water and soda ash has been made periodically to replenish the components of the withdrawn liquor.

Attempts to withdraw saturated sodium carbonate solution, devoid of solids, from storage have been disappointing in that even when using rather sophisticated withdrawal means such as floating swivel pipes (see British Patent No. 811,168) within the storage tank, suspended monohydrate crystal has been present in the withdrawn solution.

In the past, it has been necessary to allow substantial periods of time after the addition to the tank of water, soda ash, or both, and to effect circulation of the water or carbonate solution, to permit the stored solution to reach the desired concentration and a reasonable degree of clarity. Introduction of water into the bottom of the tank has been proposed, but has failed to yield in a short time solution saturated with sodium carbonate because of the pronounced channeling effect of liquor rising in the palpable layer of monohydrate crystal; recirculation of liquor in an attempt to alleviate this problem frequently results in aggravation of the channeling. Accordingly, withdrawal of sodium carbonate solution has been on a discontinuous basis, the withdrawal being interrupted by the charging and settling operation.

It is an object of the present invention to provide a process whereby sodium carbonate may be withdrawn from the storage tank at will, continuously or from time to time as required, in clear form, i.e., free of suspended monohydrate crystal.

It is another object of the invention to provide a sodium carbonate solution, which is always saturated despite the timing of the addition of water to replenish withdrawn liquor, whether concomitant with the withdrawal or otherwise.

It is still another object of the invention to provide for withdrawal of clear saturated solution from the vessel simultaneous with or in any other desired time relation with respect to the addition of soda ash to the vessel.

It is still another object to permit a continuous and simultaneous discharge of the solution and charging of ash and water.

A further object is to provide a method for clear solution recovery for which the necessary apparatus is simple and economical.

Other objects will be apparent from the description which follows.

In accordance with the invention, a substantial layer of monohydrate crystal in sodium carbonate solution is provided within a storage tank, the layer preferably being several feet in depth and the liquor being in quantity adequate to provide a supernatant layer of sodium carbonate solution, which may be relatively shallow or relatively deep.

After initial formation of the bed of slurry and the supernatant layer, as and when solution withdrawal is required withdrawal is effected along an upward enclosed unobstructed path beginning preferably at least one foot below the upper surface of the slurry bed and preferably adjacent to the bottom of the tank. The direction of the path is from the slurry bed through the supernatant layer to the point of consumption or further storage.

We have discovered that if the upward velocity of the solution does not exceed 0.3 ft./min., all of the objects referred above may be realized.

Water and ash are added as needed to maintain the supernantant layer and the required depth of slurry. Water addition may be intermittent or continuous as may be the addition of soda ash. The two may be added simultaneously, either independently or as an exteriorly formed slurry. Alternatively, the soda ash may be added periodically as convenient from a railroad car or other storage means. If soda ash is added in dry form, it is desirable to agitate the liquid layer by any known means to accelerate dispersion of the solid in the liquor. As indicated, the withdrawal of liquor may be concomitant with the addition of the solid or water with no interruptions being necessary for any reason as noted, however, while preferably maintaining the layer of slurry at least one foot above the entrance to the withdrawal path.

It is surprising and contrary to expectation that with the net flow of soda ash and water at all times downwardly through the layer of monohydrate crystal, which is characteristic of this invention, withdrawal of saturated sodium carbonate solution free of suspended monohydrate crystal may be accomplished. Rather, it would be expected that the dissolving power of the water and liquor while moving downwardly through the bed of slurry would result in the formation of a withdrawal stream containing partially dissolved very finely divided monohydrate crystal in suspension.

Referring to the drawing:

The sole figure of the drawing is a schematic diagram showing a tank and piping which are preferably used to accomplish the method of our invention.

The figure shows a tank 1 in which there is a vertical pipe of selected diameter which is open at the bottom, such opening being adjacent to the bottom of the tank. The vertical pipe must be sized so that the maximum upward velocity will not exceed 0.3 ft./min. Such withdrawal pipe may be single or multiple provided, again, that the maximum upward velocity is not exceeded in any of the pipes. This pipe will be called withdrawal pipe 2. The solution may be drawn through this pipe at the required velocity by siphoning, pumping, or similar means. A flow meter or other means of control may be attached to the withdrawal pipe to regulate the critical upward velocity of the solution therein. Just below the top of the tank 1 is the surface of a supernatant layer of sodium carbonate solution 3, which layer is above slurry layer 4. As noted, slurry layer 4 is composed of a suspension of sodium carbonate monohydrate crystal in sodium carbonate solution. Withdrawal pipe 2 extends from the top of tank 1 to just above the bottom thereof, typically one to six inches therefrom, leaving enough space for the liquor to enter the pipe. Inserted at the top of the tank is an inlet for introducing additional water and soda ash as required, such inlet being designated as inlet 5. It is preferably at the top of the tank; however, water and soda ash can be added from any place in the tank provided they are permitted to flow downwardly from the supernatant layer to the slurry layer. Withdrawal pipe 2 empties into dilution tanks, which are not shown. In the dilution tanks, the strength of the desired sodium carbonate solution is adjusted downward from the entering saturated solution, as required. It should be noted that withdrawal pipe 2 can be place anywhere in tank 1 such as adjacent to the side of the tank and may be provided by an arcuate or planar partition member attached to the side of the tank to provide a withdrawal column adjacent thereto.

It is important that the slurry contain sodium carbonate monohydrate and that this hydrate is not changed to the higher hydrades of sodium carbonate. This is accomplished by maintaining the contents of the tank at a temperature which is above 35° C. At this or higher temperatures, the monohydrate in the slurry may be maintained in stable equilibrium with a supernatant layer of saturated solution. At least part of the required heat is evolved in the dissolution of the monohydrate. If necessary, additional heat may be supplied by direct injection of live steam into the tank. This, incidentally, may furnish part or all of the added water. The invention makes possible continuous withdrawal of solution with proper timing of the charge of liquor components; however, the withdrawal may be intermittent if required by the operation consuming the liquor.

There is no lower limit for the upward velocity of withdrawal, which must not exceed 0.3 ft./min., except the bounds of practicality. Since 0.3 ft./min. is a slow rate of withdrawal, that specific rate is most practical and preferred.

*Example*

The storage system comprises a storage tank with capacity for approximately one or more hopper cars of light soda ash, such as a covered hopper car having a 2,000 cubic feet capacity containing approximately 35 tons of light soda ash; means for transferring the soda ash from the hopper car to the storage tank; and means for converting the soda ash to slurry form and for recovering sodium carbonate solution from the storage tank, the structural essentials of which are schematically described, supra, and shown in the sole figure of the drawing.

Using as a storage tank a vertical steel cylinder 12 feet in diameter with a depth of 25 feet, the tank is filled with water to a depth of 19 feet, which is about 16,000 gallons. One hopper car (about 70,000 lbs. of light soda ash) upon being unloaded into the tank gives a liquor depth of about 22 feet, with which a bed of slurry about 6.5 feet in depth and a supernatant layer of liquor is formed essentially immediately.

The depth at the top of the slurry interface is determined with a plumb line and water added to bring the liquor to a 23-foot level leaving two feet of headroom in the tank. The saturated solution removal through a withdrawal pipe 12 inches in diameter, opening six inches above the bottom of the tank, at an upward velocity of 0.3 ft./min. by siphoning, is initiated immediately. As the solution is removed and delivered to the dilution tanks, water is added continuously to maintain the level of the supernatant liquor 23 feet above tank bottom. Replenishment of soda ash is by charging in slurry form another car of soda ash when the slurry bed is depleted to a depth of one foot above the pipe inlet.

In an alternative operation water is added to the tank at a rate necessary to maintain the 23-foot level, but discontinued prior to introduction of the solid charge while continuing withdrawal of liquor, until a level of 19 feet is reached, at which point the soda ash is added.

We claim:
1. A process for producing a clear, saturated sodium carbonate solution, substantially devoid of solids, from a sodium carbonate monohydrate slurry storage system comprising:
 (a) providing, initially, a lower layer of said slurry and a supernatant aqueous layer;
 (b) withdrawing a clear solution being substantially free of suspended crystals of sodium carbonate monohydrate from a level below the top of the layer of slurry upwardly through said slurry layer and supernatant layer in an enclosed, unobstructed path at a velocity which does not exceed 0.3 ft./min.;
 (c) adding water to the top of the system; and
 (d) adding sodium carbonate to the top of the slurry layer as required to maintain the same above the withdrawal level of the solution.

2. The process as defined in claim 1 wherein the water addition and solution withdrawal are effected simultaneously.

3. The process as defined in claim 1 wherein the solution is withdrawn from a level at least one foot below the top of the layer of slurry.

References Cited

UNITED STATES PATENTS

| | | | |
|---|---|---|---|
| 2,614,032 | 10/1952 | Eichstaedt | 23—272 |
| 2,721,209 | 10/1955 | Dauncey | 23—302 X |
| 2,887,360 | 5/1959 | Hoekje | 23—302 X |
| 2,962,348 | 11/1960 | Seglin | 23—302 X |
| 3,119,655 | 1/1964 | Print | 23—312 X |
| 3,232,700 | 2/1966 | Englund | 23—312 X |

NORMAN YUDKOFF, *Primary Examiner.*